(12) United States Patent
Lee

(10) Patent No.: US 7,465,781 B2
(45) Date of Patent: *Dec. 16, 2008

(54) METHOD FOR MAKING POLYBENZOBISOXAZOLE CONTAINING POLYMER

(75) Inventor: Kiu-Seung Lee, Philadelphia, PA (US)

(73) Assignee: E.I. du Pont de Nemours & Company, Wilmington, DE (US)

( * ) Notice: Subject to any disclaimer, the term of this patent is extended or adjusted under 35 U.S.C. 154(b) by 580 days.

This patent is subject to a terminal disclaimer.

(21) Appl. No.: 11/180,234

(22) Filed: Jul. 13, 2005

(65) Prior Publication Data

US 2007/0015898 A1 Jan. 18, 2007

(51) Int. Cl.
*C08F 6/10* (2006.01)
*C08F 6/12* (2006.01)
*C08G 73/22* (2006.01)

(52) U.S. Cl. ............ 528/486; 528/487; 528/335; 528/336; 528/341; 528/422; 528/503; 528/272

(58) Field of Classification Search ........... 528/486, 528/487, 335, 336, 341, 422, 503, 272
See application file for complete search history.

(56) References Cited

U.S. PATENT DOCUMENTS

| | | | |
|---|---|---|---|
| 3,767,756 A | 10/1973 | Blades | |
| 3,819,587 A | 6/1974 | Kwoleck | |
| 3,869,429 A | 3/1975 | Blades | |
| 3,869,430 A | 3/1975 | Blades | |
| 4,423,202 A | 12/1983 | Choe | |
| 5,883,259 A | 3/1999 | Kim et al. | |

OTHER PUBLICATIONS

Hsiao et al., "Synthesis and Properties of Aromatic Poly(o-hydroxy amide)s and Polybenzoxazoles Based on the Bis(ether benzoyl chloride)s from Hydroquinone and Its Methyl-tert-Butyl-, and Phenyl-Substituted Derivatives", J. of Polymer Science, Polymer Chemistry Edition, vol. 37, No. 13 (1999), pp. 2129-2136.

Caruso et al., "Synthesis and Preliminary Characterization of a New Fully Aromatic Mesogenic Polyester Containing a 2-Phenylbenzoxazole Group", Macromolecules, vol. 25 (1992), pp. 2290-2293.

*Primary Examiner*—Duc Truong
(74) *Attorney, Agent, or Firm*—Andrew Golian

(57) ABSTRACT

A method of making polybenzobisoxazole containing polymer by use of a non-polybenzobisoxazole polymer, hydroxylating the polymer, forming a solidified polymer and heating the solidified polymer wherein ring closure occurs in the hydroxylated polymer.

10 Claims, No Drawings

METHOD FOR MAKING POLYBENZOBISOXAZOLE CONTAINING POLYMER

BACKGROUND OF THE INVENTION

1. Field of the Invention

This invention is directed to a novel method for making polybenzobisoxazole containing polymers. This is accomplished by first forming a non-polybenzobisoxazole polymer and converting repeat units of the polymer to a polybenzobisoxazole.

2. Description of Related Art

Fibers formed from rod-like polymers are commonly used in a variety of applications including ballistics, ropes and cables, and cut resistant apparel. Polybenzobisoxazole polymers provide excellent physical properties due to their rod-like structure.

Fibers from rod-like polymers are typically formed by extruding a polymer solution through a spinneret. Due to the limited solubility of (cis-polybenzobisoxazole polymers) (c-PBO) such as poly(benzo[1,2 d: 5,4-d']bisoxazole-2,6-diyl-1,4-phenylene), fibers produced from such polymers are typically spun from strong mineral acids such as polyphosphoric acid (PPA). Residual polyphosphoric acid present in the fiber over time can cause the physical properties of the fiber to degrade.

Also, instead of fibers, polymers such as in the form of films or sheets are likewise useful.

What is therefore needed is a method of producing polymers such as cis isomers of polybenzobisoxazole polymers without the use of polyphosphoric acid.

BRIEF SUMMARY OF THE INVENTION

This invention relates to a method of making polybenzobisoxazole containing polymer comprising the steps of:

a) forming a polymer solution comprising a solvent and a polymer having the structure:

STRUCTURE I

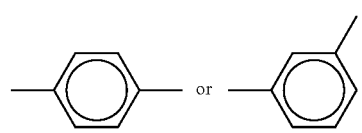

wherein $Ar_1$ is

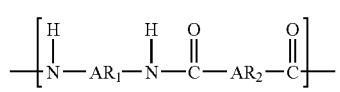

$Ar_2$ is

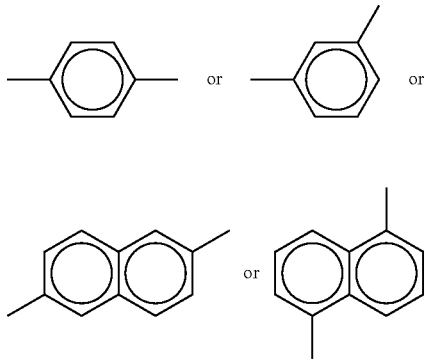

b) contacting the polymer solution of a) with a oxidizing agent in the presence of an alkyl carboxylic acid which provides oxygen atoms to hydroxylate at least a portion of $Ar_1$, in forming a hydroxylated polymer with ortho hydroxyl groups, c) forming a solidified polymer from the hydroxylated polymer of step b), d) heating the solidified polymer to form ring closure of at least a portion of ortho-hydroxyl groups.

DETAILED DESCRIPTION OF THE INVENTION

The invention relates to a method of making polybenzobisoxazole containing polymer by first producing an aromatic polyamide polymer and subsequently converting the aromatic polyamide polymer into a polybenzobisoxazole containing polymer.

The initial step in the reaction procedure involves forming a solution of the polymer of Structure I which is as defined in the Summary of the Invention. Typical solvents in forming the solution include but are not limited to sulfuric acid, polyphosphoric acid, methane sulfonic acid, n-methylpyrrolidinone, dimethylformamide, dimethylacetamide, and tetrahydrofuran. Preferably, the solvent is sulfuric acid or n-methylpyrrolidinone. Most preferably, the solvent is sulfuric acid.

The polymers of Structure I are known in the art and can be formed by reaction an aromatic diamine and an aromatic diacid.

Suitable diamine monomers include but are not limited to p-phenylene diamine, m-phenylene diamine, 4,4'-diphenyldiamine, 3,3'-diphenyldiamine, 3,4'-diphenyldiamine, 4,4'-oxydiphenyldiamine, 3,3'-oxydiphenyldiamine, 3,4'-oxydiphenyldiamine, 4,4'-sulfonyldiphenyldiamine, 3,3'-sulfonyldiphenyldiamine, 4,4'-sulfonyldiphenyldiamine, 3,3'-sulfonyldiphenyldiamine, and 3,4'-sulfonyidiphenyldiamine. Preferably, the aromatic diamine is m-phenylene diamine or p-phenylene diamine. Suitable diacid monomers include but are not limited to terephthalic acid, isophthalic acid, 2,6-naphthalenedicarboxylic acid, 4,4'-oxydibenzoic acid, 3,3'-oxydibenzoic acid, 3,4'-oxydibenzoic acid, 4,4'-sulfonyldibenzoic acid, 3,3'sulfonyldibenzoic acid, 3,4'-sulfonyldibenzoic acid, 4,4'-dibenzoic acid, 3,3'-dibenzoic acid, and 3,4'-dibenzoic acid. Preferably, the diacid monomer is terephthalic acid, isophthalic acid, or 2,6-naphthalenedicarboxylic acid, with terephthalic acid being the most preferred.

The following structural representations are where Ar1 is as defined:

STRUCTURE Ia

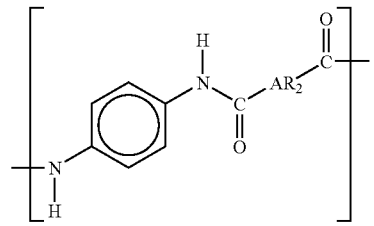

STRUCTURE Ib

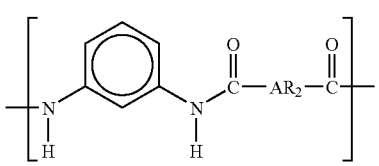

A preferred structure I polymer has the structure:

STRUCTURE Ic

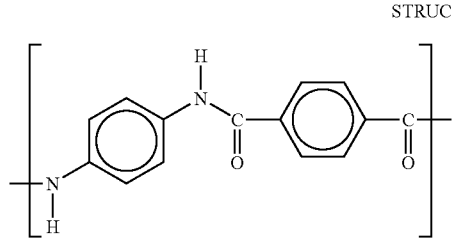

This structure Ic is commonly referenced as PPD-T.

A further preferred structure I polymer has the structure:

STRUCTURE Id

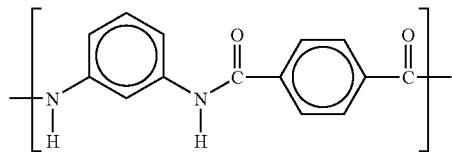

This structure Id is commonly referenced as MPD-T.

A further step in the reaction procedure comprises hydroxylating $Ar_1$ groups of Structure I resulting in ortho hydroxyl groups. The hydroxylating step involves the use of an alkyl carboxylic acid and an oxidizing agent. Suitable alkyl carboxylic acids include formic acid, acetic acid, propanoic acid, butanoic acid, and the like. Preferably the alkyl carboxylic acid is formic acid or acetic acid. Most preferably the alkyl carboxylic acid is acetic acid. Alkyl carboxylic acids have a dissociation constant less than that of sulfuric acid and contain the oxygen necessary for the hydroxylation.

Suitable oxidizing agents include nitrosylsulfuric acid, lead tetraacetate, and sodium nitrate. Preferably, the oxidizing agent is nitroxylsulfuric acid.

Preferably, the oxidizing agent is added to the polymer solution containing the acid with mechanical stirring under an inert atmosphere. By inert atmosphere it is meant an atmosphere that is essentially unreactive. Suitable inert atmospheres include but are not limited to nitrogen, helium, and noble gases.

With hydroxylation of $Ar_1$ groups of Structures I, the following will be present in the polymer:

STRUCTURE II TRANS

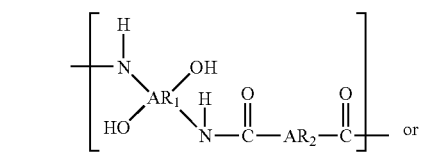

or

STRUCTURE II CIS

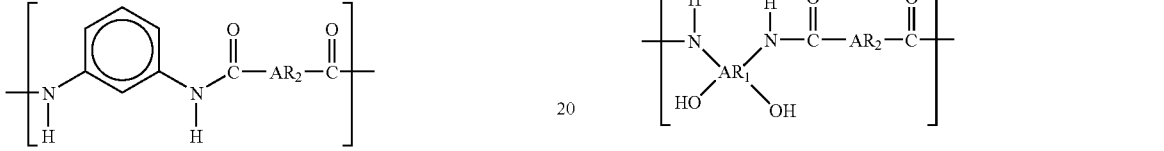

The corresponding hydroxylated structures for Ia, Ib, Ic and Id are as follows

STRUCTURE IIa

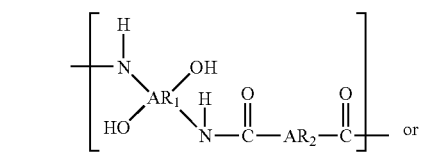

STRUCTURE IIb

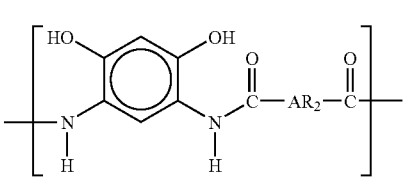

STRUCTURE IIc

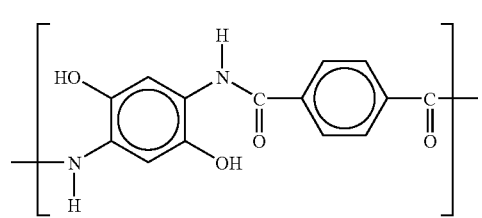

STRUCTURE IId

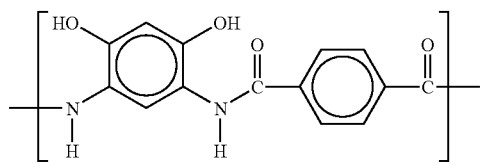

It is understood that in the typical hydroxylation step that only a portion of the $Ar_1$ groups will be hydroxylated. Accordingly, in most instances, unreacted $Ar_1$ groups will be present in the final polymer.

A further step in the method involves formation of a solidified polymer from the polymer wherein $Ar_1$ groups contain ortho hydroxyl groups (as well as the polymer containing unreacted Ar$_1$ groups). The step may be undertaken with known and conventional methods in formation of aromatic polyamide polymers including fibers. This step can be done by any technique forms a solid polymer from a solution such as film or fiber. Fibers from solution may be by wet spinning, dry-jet wet (air-gap) spinning, jet-attenuated spinning, centrifugal spinning, electro-spinning, and others. Examples of the most useful methods for the spinning of fibers of the present invention can be found in U.S. Pat. Nos. 3,869,429, 3,869,430, and 3,767,756. After solid polymer formation the hydroxylated polymer can be processed by methods known in the art to reduce the amount of residual solvent and improve the mechanical properties of the polymer such as washing, pH modification, heat treatment, drying, and crystallization. Preferably, the polymers are coagulated in a water bath, washed in a second water bath, neutralized in a neutralization bath and dried.

The further step in the reaction procedure employs heating of the formed solid polymer. The heating step results in ring closure of a portion of the Ar$_1$ groups containing ortho hydroxyl groups. A suitable temperature range for convenience is from 170 to 280 degrees Celsius, preferably 185 to 250 degrees Celsius, with the most preferred temperature being between 200 and 240 degrees Celsius. Typical heating times range from 5 to 60 seconds Accordingly, an oxazole containing polymer is formed.

It is understood in the case of a fiber that the fiber during heating may be subjected to tension which is known in fiber formation. A suitable tension is in a range from 1.0 to 18.0 grams per denier (gpd) with 2.0 to 10.0 gpd being preferred and 2.5 to 5.0 gpd being most preferred.

As a result of ring closure the fiber will contain repeating units of the following structure:

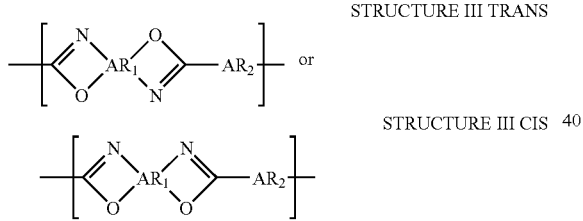

STRUCTURE III TRANS or

STRUCTURE III CIS

The corresponding ring closed structures which result from structures II a, b, c and d are as follows:

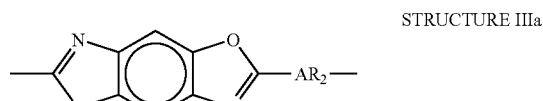

STRUCTURE IIIa

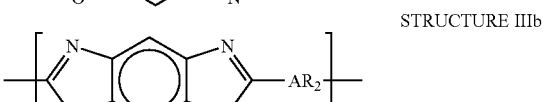

STRUCTURE IIIb

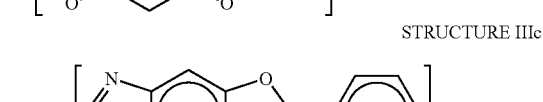

STRUCTURE IIIc

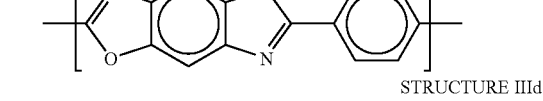

STRUCTURE IIId

It is understood in the heating step that typically only a portion of the Ar$_1$ groups containing ortho hydroxyl groups will result in ring closure, i.e. an oxazole containing polymer. However, it is believed that at least 30% and generally more than 50% of the ortho hydroxyl groups will be converted.

Therefore, in the present invention the final polymer will typically contain repeating units at least of structure III and at least one of structure I and structure II. However it is within the scope of the invention that structure III is present with only one of structure I or structure II.

Also for the reaction procedure the designation in use of Ia will result in IIa for hydroxylation and IIIa for ring closure. Similarly the b, c and d designations are applicable in a species of starting polymer proceeding to hydroxylation and the proceeding to ring closure.

As previously set forth, preferred starting materials of structure Ic or Id are PPD-T or MPD-T. The following represents a schematic representation of the reaction procedure:

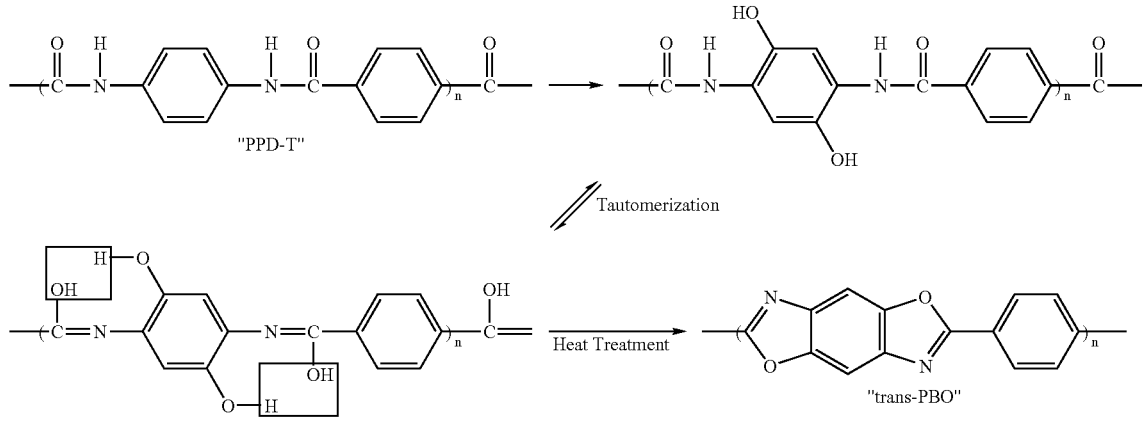

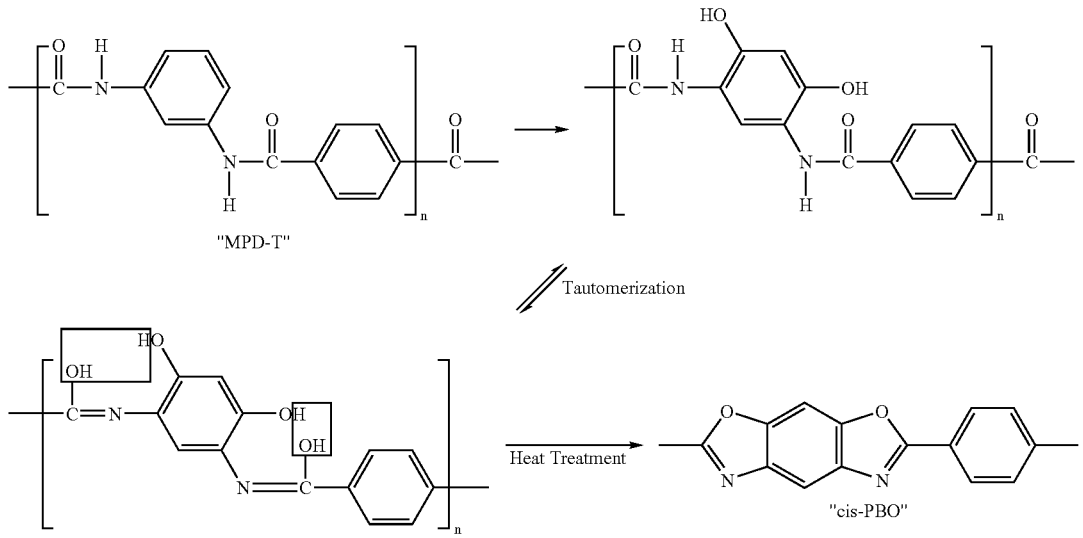

Test Methods

Tenacity, elongation, and modulus are determined according to ASTM D 3822. Tenacity (breaking tenacity), elongation to break, and modulus of elasticity are determined by breaking test fibers on an Instron tester. Tenacity is reported as breaking stress divided by linear density. Modulus is reported as the slope of the initial stress/strain curve converted to the same units as tenacity. Elongation is the percent increase in length at break.

Inherent Viscosity is the ratio of the natural logarithm of the relative viscosity to the mass concentration of the polymer as measured with respect to a solution of 0.5 g of the polymer in 100 ml of concentrated sulfuric acid at 25° C.

Relative Viscosity is the ratio of the viscosity of the polymer in solution to that of the solvent expressed as the time of efflux of the solution divided by the time of efflux of the solvent at constant temperature.

In the following examples all parts and percentages are by weight unless otherwise indicated.

EXAMPLE 1

A reaction kettle equipped with nitrogen inlet/outlet and a basket stirrer driven by high pressure air was set-up in silicone oil bath. 3.0 grams of PPD-T [p-phenyleneterephthalamide] of inherent viscosity of 6.0 and 100 grams of sulfuric acid were added under nitrogen and the mixture was gradually heated to about 70 degrees Celsius to form a solution. To this solution was added 1.68 grams of nitrosylsulfuric acid (95%) and 1 gram of acetic acid. The mole % of nitrosulfuric acid (NSA) on the basis of NSA and PPD-T was 50.0%. The solution was stirred for 12 hours at 70 degrees Celsius under nitrogen. The color of the solution changed to bluish green from yellow as a result of the hydroxylation reaction. The resulting solution was precipitated in aqueous medium at room temperature, washed five times, each time with about 200 ml water, and finally neutralized to a pH of about 9 with a dilute sodium hydroxide solution. The yellowish brown precipitated polymer was filtered and dried in vacuum oven at 120° C. overnight under nitrogen. A dried but not heat treated sample was sent for elemental analysis for C, H, N, and O by standard combustion method. The results are as follows:

| | Elements | | | |
|---|---|---|---|---|
| | C | H | O | N |
| PPD-T | 69.21 | 4.14 | 11.81 | 11.60 |
| Sample | 70.21 | 4.24 | 13.67 | 11.58 |

From the following calculation, it was determined that about 15% of the $Ar_1$ groups (as defined for PPD-T) were hydroxylated.

(O content of the sample–O content of PPD-T control)/(O content of 100% Substitution–O content of PPD-T control)

$(13.67-11.81)(23.68-11.81) \times 100 = 1.86/11.87 \times 100 = 15.67\%$

EXAMPLES 2-7

20.4 kg of 100% sulfuric acid and 0.21 kg of acetic acid were frozen in a mixer equipped with twin spiral blades under nitrogen. 4.9 kg of PPD-T polymer were added to this frozen sulfuric acid slurry at −20 degrees Celsius. The mixture was continuously stirred while the temperature was gradually increased to about 82 degrees Celsius over a period of 15 minutes. Various amounts of nitrosylsulfuric acid were added to the solution as shown in Table 1. The mixture was stirred for 2 additional hours with vigorous mixing at 82° C. under nitrogen. The polymer solution (dark green color) was spun into fiber by standard air-gap spinning as described in U.S. Pat. No. 3,819,587 to form a 400 denier yarn of 1.5 dpf filaments. The yarn was then heat treated to effect ring closure at a temperature of 185 degrees Celsius for 15 minutes.

TABLE 1

| Examples | Mole % of NSA/PPD-T | Yarn Inherent | Tenacity (gpd) | Elongation (%) | Modulus (gpd) |
|---|---|---|---|---|---|
| 2 | 14.1 | 7.06 | 19.3 | 3.61 | 520 |
| 3 | 21.1 | 6.62 | 20.3 | 3.70 | 550 |
| 4 | 28.3 | 6.84 | 19.1 | 3.65 | 577 |
| 5 | 35.5 | 5.97 | 22.1 | 3.85 | 609 |
| 6 | 42.4 | 5.95 | 22.3 | 3.79 | 634 |
| 7 | 0 | 5.98 | 17.4 | 2.72 | 529 |

In Table 1 mole % for PPD-T means the repeating formula structure Ic.

EXAMPLE 8

In a dry 1 liter reaction kettle equipped with nitrogen inlet and outlet and basket stirrer, added 97 parts of 100.1% sulfuric acid, 3 parts of poly(p=phenyleneterephthalamide)[PPD-T] of inherent viscosity of 6.3, and 3 parts of nitrosylsulfuric acid. The mixture was heated to 50° C. and stirred for 5 hours under nitrogen or until all PPD-T polymer was completely dissolved. 3 part of glacial acetic acid was added and the temperature was raised to 75° C. and stirred for 3 additional hours. Small portion of the resulting light green polymer solution was placed in glass plate and smeared into thin film by using 20 mil doctor blade. The polymer film was immersed in distilled water in a glass tray in order to extract sulfuric acid. The resulting polymeric film was washed several times to remove residual sulfuric acid until the liquid shows neutral pH. The resulting film was placed in 120° C. vacuum oven for drying. The resulting film is in light brown color. The dry film was placed in 250° C. oven for 10 minutes for heat treatment for cyclization. As dried but not heat treated film sample was submitted for elemental analysis of C, H, N, O together with PPD-T polymer control to determine degree of hydroxylation. The results are as follows:

|  | Elements | | | |
|---|---|---|---|---|
|  | C | H | O | N |
| PPD-T | 69.21 | 4.14 | 11.81 | 11.60 |
| Sample | 70.21 | 4.24 | 13.67 | 11.58 |

What is claimed is:

1. A method of making polybenzobisoxazole containing polymer comprising the steps of:
   a) forming a polymer solution comprising a solvent and a polymer having the structure:

STRUCTURE I

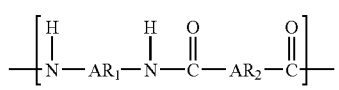

wherein
$Ar_1$ is

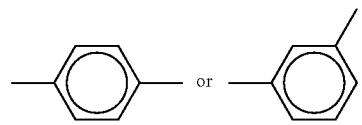

$Ar_2$ is

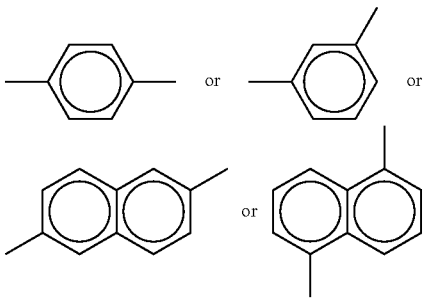

b) contacting the polymer solution of a) with a oxidizing agent in the presence of an alkyl carboxylic acid which provides oxygen atoms to hydroxylate at least a portion of $Ar_1$, in forming a hydroxylated polymer with ortho hydroxyl groups,
   c) forming a solidified polymer from the hydroxylated polymer of step b),
   d) heating the solidified polymer to form ring closure of at least a portion of ortho-hydroxyl groups.

2. The method of claim 1 wherein $Ar_1$ is:

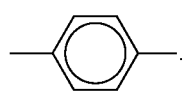

3. The method of claim 2 wherein $Ar_2$ is:

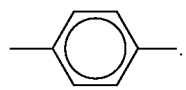

4. The method of claim 1 wherein $Ar_1$ is:

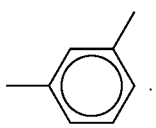

5. The method of claim 4 wherein $Ar_2$ is:

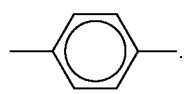

6. The method of claim 1 wherein the oxidizing agent is nitrosulfuric acid, lead tetracetate or sodium nitrate.

7. The method of claim 6 wherein the oxidizing agent is nitrosulfuric acid.

8. The method of claim 1 wherein the alkyl carboxylic acid is formic acid or acetic acid.

9. The method of claim 8 wherein the alkyl carboxylic acid is acetic acid.

10. The method of claim 1 wherein the heating is in a range from 170 to 280 degrees Celsius.

* * * * *